United States Patent
Yang et al.

(10) Patent No.: US 9,980,148 B2
(45) Date of Patent: May 22, 2018

(54) COLLABORATIVE SPECTRUM SENSING IN COGNITIVE RADIO NETWORK

(71) Applicant: Harman International Industries, Inc, Stamford, CT (US)

(72) Inventors: Zeng Yang, Shanghai (CN); Qingshan Zhang, Shanghai (CN); Guoxia Zhang, Shanghai (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 43 days.

(21) Appl. No.: 14/771,488

(22) PCT Filed: Mar. 19, 2013

(86) PCT No.: PCT/CN2013/072894
§ 371 (c)(1),
(2) Date: Aug. 28, 2015

(87) PCT Pub. No.: WO2014/146257
PCT Pub. Date: Sep. 25, 2014

(65) Prior Publication Data
US 2016/0007208 A1    Jan. 7, 2016

(51) Int. Cl.
*H04W 4/00* (2018.01)
*H04W 16/14* (2009.01)
(Continued)

(52) U.S. Cl.
CPC ............ *H04W 16/14* (2013.01); *H04W 4/02* (2013.01); *H04W 4/046* (2013.01)

(58) Field of Classification Search
CPC ........ H04W 16/14; H04W 4/02; H04W 4/046
(Continued)

(56) References Cited

U.S. PATENT DOCUMENTS

2010/0329180 A1    12/2010  Rao et al.
2011/0018737 A1*    1/2011  Hsu .................... G08G 1/161
                                                                340/903

(Continued)

FOREIGN PATENT DOCUMENTS

| CN | 101754402 A * | 6/2010 |
| CN | 102202316 A | 9/2011 |
| EP | 2405685 A1 | 1/2012 |

OTHER PUBLICATIONS

International Search Report Application No. PCT/CN2013/072894, dated Dec. 26, 2013.
(Continued)

*Primary Examiner* — Tanmay Shah
(74) *Attorney, Agent, or Firm* — Artegis Law Group, LLP

(57) ABSTRACT

A method and system for collaborative spectrum sensing in a cognitive radio network is provided. The method may include: receiving through a cognitive radio network a plurality of sensing results of availability of a channel, where the plurality of sensing results are generated by a corresponding number of vehicles within the cognitive radio network, respectively, where broadcasting of the plurality of sensing results is controlled based on positions of vehicles within the cognitive radio network; and determining whether the channel is available based on the plurality of sensing results. By using the method, the efficiency of collaborative spectrum sensing can be improved.

22 Claims, 6 Drawing Sheets

(51) Int. Cl.
    *H04W 4/04*     (2009.01)
    *H04W 4/02*     (2018.01)

(58) Field of Classification Search
    USPC ......................................................... 455/422
    See application file for complete search history.

(56) References Cited

U.S. PATENT DOCUMENTS

| | | |
|---|---|---|
| 2012/0009874 A1 | 1/2012 | Kiukkonen et al. |
| 2012/0122477 A1 | 5/2012 | Sadek et al. |
| 2013/0053059 A1 | 2/2013 | Kruglick |

OTHER PUBLICATIONS

Extended European Search Report Application No. 13881379.5, dated Oct. 18, 2016, 8 pages.

\* cited by examiner

COLLABORATIVE SPECTRUM SENSING IN COGNITIVE RADIO NETWORK

CROSS-REFERENCE TO RELATED APPLICATIONS

The present application is a national stage application of international patent application number PCT/CN2013/072894 titled, "COLLABORATIVE SPECTRUM SENSING IN COGNITIVE RADION NETWORK," filed on Mar. 19, 2013. The subject matter of this related application is hereby incorporated herein by reference.

TECHNICAL FIELD

The present disclosure generally relates to collaborative spectrum sensing in a cognitive radio network.

BACKGROUND

Cognitive Radio (CR) is a promising technology in enabling access of intermittent periods of unoccupied frequency bands. Collaborative spectrum sensing is a key function of CR to enhance sensing performance by sharing sensing information of all CR users. However, the sensing information from all CR users tends to congest channels and cause a large number of overheads. Therefore, a more effective method for collaborative spectrum sensing in a cognitive radio network is needed.

SUMMARY

In one embodiment, a method for collaborative spectrum sensing in a cognitive radio network is provided. The method may include: a first vehicle generating a request for assistance on sensing availability of a channel; the first vehicle broadcasting in a cognitive radio network the request and position information of the first vehicle; the first vehicle receiving a plurality of sensing messages from other vehicles within the cognitive radio network which sensing messages are generated in response to the request, where a sensing message includes a sensing result of availability of the channel and a piece of position information of a vehicle which broadcasts the sensing message, where broadcasting of the plurality of sensing messages is controlled based on position information of vehicles within the cognitive radio network; and determining whether the channel is available based on the plurality of sensing messages.

In some embodiments, a piece of position information may indicate where a vehicle locates when the request is received by the vehicle. In some embodiments, a piece of position information may indicate where a vehicle locates when a sensing result is generated by the vehicle.

In some embodiments, the request may further include information of coverage area and location of a transmitter, and spectrum of the channel.

In some embodiments, the method may further include: the first vehicle generating a first sensing result of availability of the channel, where whether the channel is available is determined based on the first sensing result and the plurality of sensing messages.

In some embodiments, position information of a vehicle may be obtained by a positioning device such as a global positioning system (GPS) device mounted on the vehicle.

In some embodiments, if the number of received sensing results indicating that the channel is available reaches a predetermined number, the first vehicle may determine that the channel is available. In some embodiments, an M-out-of-N method may be used to determine whether the channel is available or not, where M is less than N.

In some embodiments, sensing messages may be broadcast on a Common Control Channel (CCC).

In one embodiment, a method for collaborative spectrum sensing in a cognitive radio network is provided. The method may include: receiving through a cognitive radio network a plurality of sensing results of availability of a channel, where the plurality of sensing results are generated by a corresponding number of vehicles within the cognitive radio network, respectively, where broadcasting of the plurality of sensing results is controlled based on positions of vehicles within the cognitive radio network; and determining whether the channel is available based on the plurality of sensing results.

In one embodiment, a method for collaborative spectrum sensing in a cognitive radio network is provided. The method may include: receiving through a cognitive radio network a plurality of sensing results of availability of a channel, where the plurality of sensing results are generated by a corresponding number of vehicles within the cognitive radio network, respectively, where broadcasting of the plurality of sensing results is controlled based on positions of the corresponding vehicles and position of a vehicle which broadcasts a request for assistance on sensing availability of the channel; and determining whether the channel is available based on the plurality of sensing results.

In one embodiment, a method for collaborative spectrum sensing in a cognitive radio network is provided. The method may include: a first vehicle receiving through a cognitive radio network a plurality of sensing messages one after another, where a sensing message includes a sensing result of availability of a channel and a piece of position information of a vehicle which generates the sensing result; when the first vehicle receives a first new sensing message including a first piece of position information, calculating a first distance based on first position information of the first vehicle and the first piece of position information; if the first distance is greater than a predetermined value, calculating a first count-down time based on the first position information and position information contained in sensing messages received by the first vehicle; if no new sensing message is received by the first vehicle before the first count-down time ends, the first vehicle broadcasting on the cognitive radio network a new sensing message generated by the first vehicle; if a second new sensing message including a second piece of position information is received by the first vehicle before end of the first count-down time, calculating a second distance based on second position information of the first vehicle and the second piece of position information; and if the second distance is greater than the predetermined value, calculating a second count-down time based on the second position information and position information contained in sensing messages received by the first vehicle.

In some embodiments, the first position information of the first vehicle may be the same as the second position information of the first vehicle. In some embodiments, the first position information of the first vehicle may indicate a location of the first vehicle where the first vehicle receives a request for assistance on sensing availability of the channel.

In some embodiments, the first position information of the first vehicle may indicate a location of the first vehicle where the first vehicle receives the first new sensing message, and the second position information of the first vehicle may indicate a location of the first vehicle where the first vehicle receives the second new sensing message.

In some embodiments, the new sensing message may be generated by the first vehicle when it receives a request for assistance on sensing availability of the channel.

In some embodiments, the request may further include information of coverage area and location of a transmitter, and spectrum of the channel.

In some embodiments, the method may further include: determining whether the first vehicle is within the coverage area of the transmitter, if the first vehicle is within the coverage area of the transmitter, the first vehicle calculating the first distance.

In one embodiment, a system for collaborative spectrum sensing in a cognitive radio network is provided. In some embodiments, the system may include: a positioning device, a transceiver, and a processing device configured to: control the positioning device to obtain position information of a first vehicle on which the system is mounted; generate a request for assistance on sensing availability of a channel; control the transceiver to broadcast in a cognitive radio network the request and the position information of the first vehicle; control the transceiver to receive a plurality of sensing messages from other vehicles within the cognitive radio network which sensing messages are generated in response to the request, where a sensing message includes a sensing result of availability of the channel and a piece of position information of a vehicle which broadcasts the sensing message, where broadcasting of the plurality of sensing messages is controlled based on position information of vehicles within the cognitive radio network; and determine whether the channel is available based on the plurality of sensing messages.

In one embodiment, a system for collaborative spectrum sensing in a cognitive radio network is provided. The system may include: a positioning device, a transceiver, and a processing device configured for: controlling the positioning device to obtain position information of a first vehicle on which the system is mounted; generating a request for assistance on sensing availability of a channel; controlling the transceiver to broadcast in a cognitive radio network the request and the position information of the first vehicle; controlling the transceiver to receive a plurality of sensing messages from other vehicles within the cognitive radio network which sensing messages are generated in response to the request, where a sensing message includes a sensing result of availability of the channel and a piece of position information of a vehicle which generates the sensing message, where broadcasting of the plurality of sensing messages is controlled based on position information of vehicles within the cognitive radio network; and determining whether the channel is available based on the plurality of sensing messages.

In one embodiment, a system for collaborative spectrum sensing in a cognitive radio network is provided. The system may include a transceiver and a processing device configured to determine whether a channel is available based on a plurality of sensing results of availability of a channel, where the plurality of sensing results are received by the transceiver through a cognitive radio network, where the plurality of sensing results are generated by a corresponding number of vehicles within the cognitive radio network, respectively, where broadcasting of the plurality of sensing results is controlled based on positions of vehicles within the cognitive radio network.

In one embodiment, a system for collaborative spectrum sensing in a cognitive radio network is provided. The system may include a transceiver and a processing device for determining whether a channel is available based on a plurality of sensing results of availability of the channel, where the plurality of sensing results are received by the transceiver through a cognitive radio network, where the plurality of sensing results are generated by a corresponding number of vehicles within the cognitive radio network, respectively, where broadcasting of the plurality of sensing results is controlled based on positions of vehicles within the cognitive radio network.

In one embodiment, a system for collaborative spectrum sensing in a cognitive radio network is provided. In some embodiments, the system may include: a positioning device, a transceiver, and a processing device for: controlling the transceiver to receive through a cognitive radio network a plurality of sensing messages one after another, where a sensing message includes a sensing result of availability of a channel and a piece of position information of a vehicle which broadcasts the sensing message; when the transceiver receives a first new sensing message, calculating a first distance based on first position information of a first vehicle on which the system is mounted and a first piece of position information contained in the first new sensing message, where the first position information of the first vehicle is obtained by the positioning device; if the first distance is greater than a predetermined value, calculating a first count-down time based on the first position information of the first vehicle and position information contained in sensing messages received by the transceiver; if no new sensing message is received by the transceiver before the first count-down time ends, controlling the transceiver to broadcast a new sensing message on the cognitive radio network which new sensing message is generated by the processing device; if the transceiver receives a second new sensing message before end of the first count-down time, calculating a second distance based on second position information of the first vehicle obtained by the positioning information and a second piece of position information contained in the second new sensing message; and if the second distance is greater than the predetermined value, calculating a second count-down time based on the second position information and position information contained in sensing messages received by the transceiver.

In one embodiment, a system for collaborative spectrum sensing in a cognitive radio network is provided. In some embodiments, the system may include: a positioning device, a transceiver, and a processing device configured to: control the transceiver to receive through a cognitive radio network a plurality of sensing messages one after another, where a sensing message includes a sensing result of availability of a channel and a piece of position information of a vehicle which generates the sensing message; when the transceiver receives a first new sensing message, calculate a first distance based on first position information of a first vehicle obtained by the positioning device and a first piece of position information contained in the first new sensing message, where the system is mounted on the first vehicle; if the first distance is greater than a predetermined value, calculate a first count-down time based on the first position information of the first vehicle and position information contained in sensing messages received by the transceiver; if no new sensing message is received by the transceiver before the first count-down time ends, control the transceiver to broadcast a new sensing message on the cognitive radio network which new sensing message is generated by the processing device; if a second new sensing message is received by the transceiver before end of the first count-down time, calculate a second distance based on second position information of the first vehicle and a second piece of position information contained in the second new sensing message; and if the second distance is greater than the predetermined value, calculate a second count-down time based on the second position information and position information contained in sensing messages received by the transceiver.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
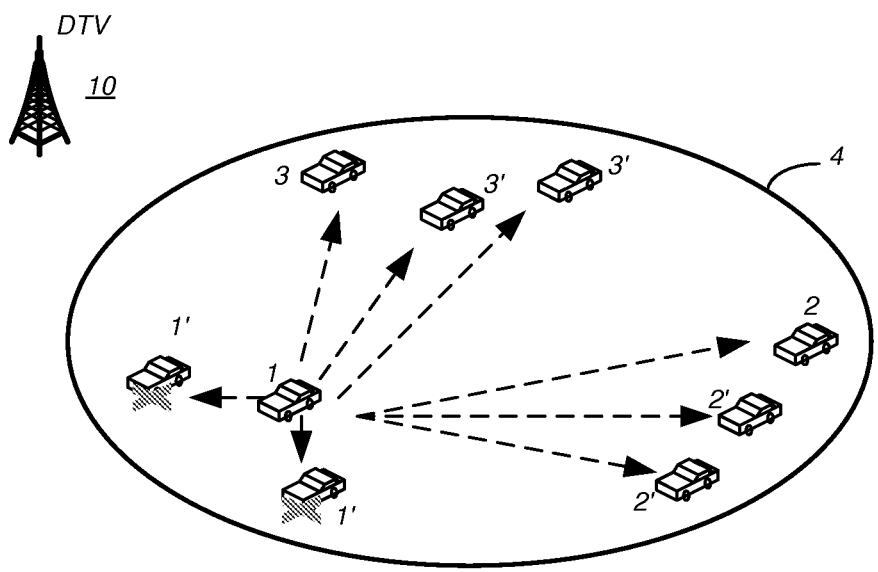
FIGS. 1 to 4 schematically illustrate examples of a cognitive radio network according to one embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

As described above, CR users suffer from channel congestion and great overheads. It is found that CR users which are spatially close to each other are likely to be affected by same environmental conditions and suffer from common biases in spectrum sensing. Therefore, position information of the CR users may be used to improve performance of collaborative spectrum sensing.

FIGS. 1 to 4 schematically illustrate examples of a cognitive radio network according to one embodiment of the present disclosure.

Referring to FIG. 1, there are a plurality of vehicles (CR users) within a cognitive radio network (simply "network" hereinafter). The network may be a Vehicular Ad Hoc Network (VANET). A primary transmitter, for example, a Digital Television (DTV) tower, is in the vicinity of the vehicles. Alternatively, a cellular base station, a Road Side Unit (RSU) or a WLAN hotspot may also serve as a primary transmitter, which may provide vacant channels for the vehicles.

Figure 5:
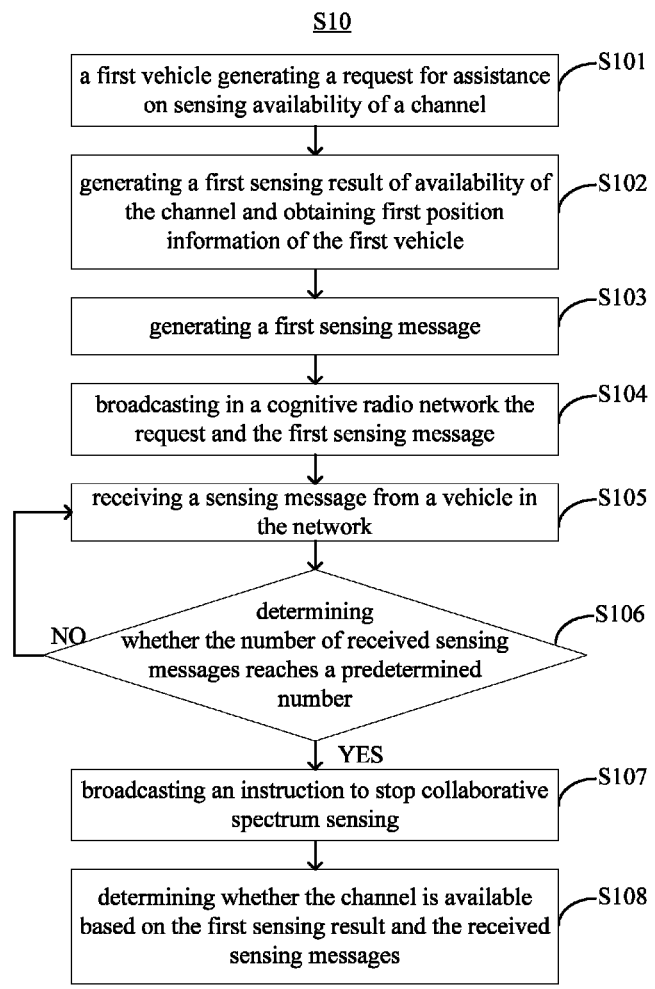
FIG. 5 illustrates a schematic flow chart of a method S10 for collaborative spectrum sensing in a cognitive radio network according to one embodiment of the present disclosure.

FIG. 5 illustrates a schematic flow chart of a method S10 for collaborative spectrum sensing in a cognitive radio network according to one embodiment of the present disclosure.

Referring to FIG. 5, in S101, a first vehicle generating a request for assistance on sensing availability of a channel. Referring to FIG. 1, the first vehicle 1 in a cognitive radio network needs more bandwidth to receive or transmit data, and it sends out a request for assistance on sensing whether there is an unoccupied channel. In some embodiments, the first vehicle 1 may request for assistance on sensing a very wide frequency range for an unoccupied channel. In some embodiments, the first vehicle 1 may request for assistance on sensing certain frequency ranges for an unoccupied channel. Usually, digital TV (DTV) channels are potential candidates.

In some embodiments, the request may further include information of coverage area and location of a transmitter, and spectrum of the channel. The information of coverage area and location of a transmitter may be used to determine whether a vehicle is within the coverage area or not.

Referring to FIG. 1, a DTV transmitter 10 is nearby the first vehicle 1, and the first vehicle 1 is in its cover area. The first vehicle 1 may request to sense availability of a channel of the DTV spectrum.

It should be noted that, the terms "first", "second", "third", and the like in the description and in the claims, are used for distinguishing between similar elements and not tend to describe a particular sequential or chronological order.

In S102, generating a first sensing result of availability of the channel and obtaining first position information of the first vehicle. In some embodiments, the first position information may indicate a location of the first vehicle where the first sensing result is generated. In some embodiments, the first position information may indicate a location of the first vehicle where the request is generated. In some embodiments, an energy detection method may be used to sense the channel by measuring power on the channel. Then a sensing result of availability of the channel may be calculated based on the measured power. Energy detection methods are well known in the art, and will not be described in detail herein. In some embodiments, the first position information may be obtained by a positioning device such as a global positioning system (GPS) device mounted on the vehicle.

Alternatively, the first vehicle may not generate a first sensing result of availability of the channel.

In S103, generating a first sensing message. The first sensing message may include the first sensing result and the first position information. In some embodiments, the first sensing message may further include predicted precision of the first sensing result, which may be used subsequently to determine whether the channel is available or not. For example, in FIGS. 1 to 3, vehicles inside a circle 4 are within the coverage area of the DTV transmitter 10. In FIG. 4, vehicles 6 are outside a circle 40, that is, they are not within the coverage area of the DTV transmitter 20 and may not be selected for collaborative spectrum sensing.

In S104, broadcasting in a cognitive radio network the request and the first sensing message. In some embodiments, the request and the first sensing message may be broadcast to vehicles in the network on a Common Control Channel (CCC) defined in the IEEE 1609 standard.

It should be noted that S103 is optional. If the first vehicle does not generate a first sensing result of availability of the channel, the first vehicle may just broadcast the request and the first position information.

In S105, receiving a sensing message from a vehicle in the network.

It should be noted that broadcasting of a sensing message by a vehicle is controlled based on position information of the vehicle within the network, which will be described in detail below. As a result, only a part of the vehicles in the network will broadcast sensing messages in response to the request.

A sensing message received by the first vehicle may include a sensing result of availability of the channel and a piece of position information which indicates location of a vehicle generating the sensing message. In some embodiments, a piece of position information may indicate where a vehicle locates when the request is received by the vehicle. In some embodiments, a piece of position information may indicate where a vehicle locates when a sensing result is generated by the vehicle. In some embodiments, the sensing message received by the first vehicle may further include predicted precision of the sensing result.

In S106, determining whether the number of received sensing messages reaches a predetermined number. The predetermined number may vary depending on that the first vehicle can make a determination that the channel is available or not. If yes, the method S10 goes to S107, broadcasting an instruction to stop collaborative spectrum sensing. Otherwise, the method S10 goes to S105, the first vehicle proceeds to receive a new sensing message.

In S108, determining whether the channel is available based on the first sensing result and the received sensing messages.

In some embodiments, an M-out-of-N method may be used to determine whether the channel is available or not, where M is less than N, N represents the number of sensing results a vehicle has, and M represents the number of sensing results indicating the channel is available or not. For example, if there are M or more sensing results indicating the channel is available, the first vehicle may determine the channel is available and occupy the channel. Otherwise, the first vehicle may determine the channel is not available.

In some embodiments, if the first vehicle does not generate a first sensing result of availability of the channel, the first vehicle may determine whether the channel is available based on the received sensing messages.

Figure 6:
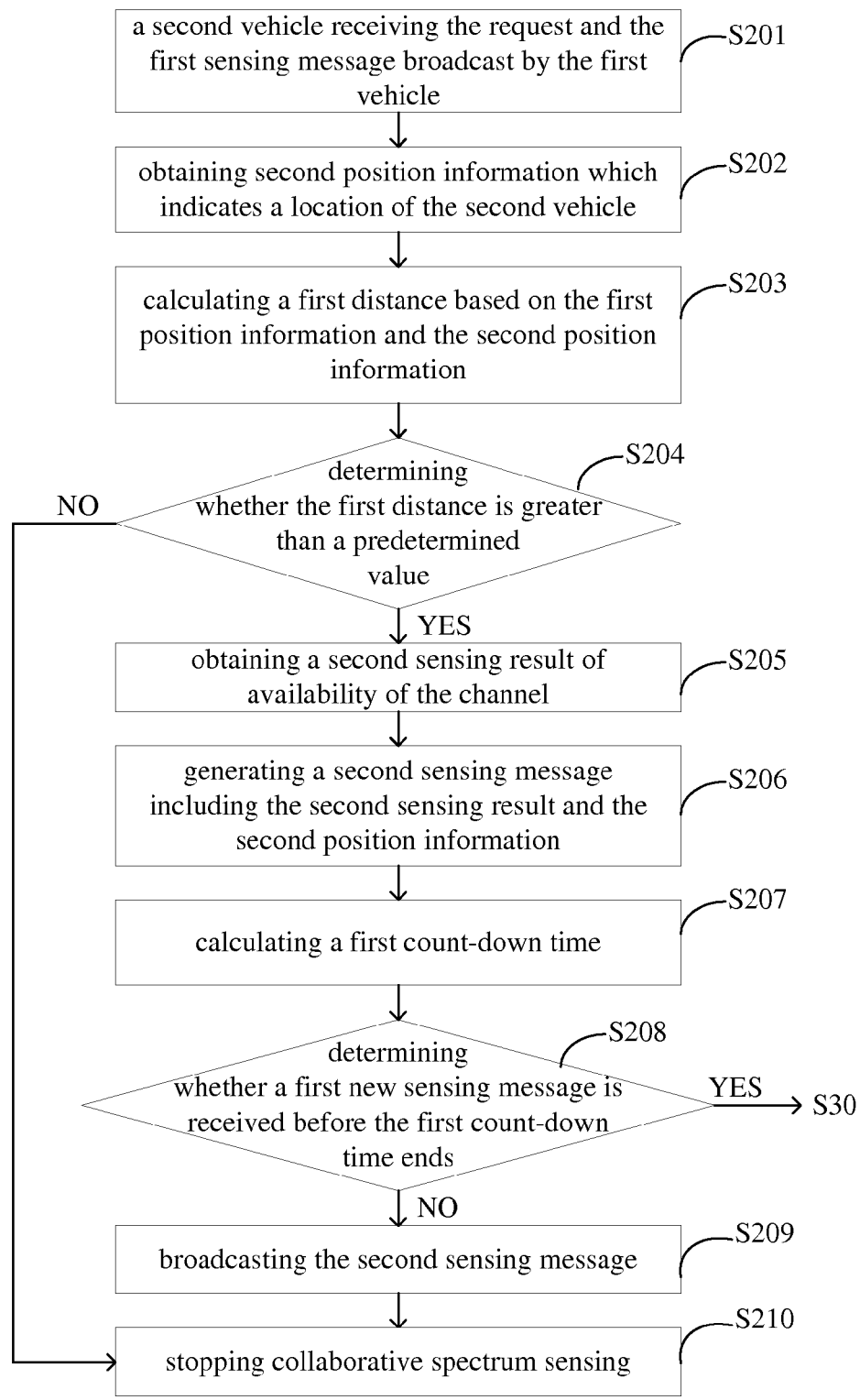
FIG. 6 illustrates a schematic flow chart of a method S20 for collaborative spectrum sensing in a cognitive radio network according to one embodiment of the present disclosure.

FIG. 6 illustrates a schematic flow chart of a method S20 for collaborative spectrum sensing in a cognitive radio network according to one embodiment of the present disclosure.

Referring to FIG. 6, in S201, a second vehicle receiving the request and the first sensing message broadcast by the first vehicle. The first sensing message may include the first sensing result and the first position information of the first vehicle. All vehicles in the network can receive through the network the request and the first sensing message from the first vehicle.

Alternatively, if the first vehicle does not generate a first sensing result of availability of the channel, the second vehicle may receive the request and the first position information.

In S202, obtaining second position information which indicates a location of the second vehicle.

In some embodiments, upon receiving the request, the second vehicle may obtain the second position information in response to the request. As shown in FIG. 1, vehicles except vehicle 1 in the network may obtain their position information upon receiving the request.

In some embodiments, if the request includes information of coverage area and location of a transmitter, the second vehicle first determines whether or not it is within the coverage area based on its position information, information of coverage area and location of the transmitter. If the second vehicle is within the coverage area of the transmitter, it proceeds to subsequent processes. Otherwise, the second vehicle may stop collaborative spectrum sensing because it may not access the channels of the transmitter (DTV).

Referring to FIG. 4, vehicle 5 broadcasts a request including information of coverage area and location of the transmitter 20. Vehicles in the network may determine whether they are within the coverage area of the transmitter 20. And two vehicles 6 outside the circle 40 may stop collaborative spectrum sensing as they are outside the coverage area of the transmitter 20 as shown in FIG. 4.

In S203, calculating a first distance based on the first position information and the second position information.

In some embodiments, each of the vehicles except vehicle 1 in the network calculates its distance between vehicle 1 and itself, as shown in FIG. 1. Of course, for vehicles not within the coverage area of the transmitter, they don't have to calculate their distances.

In S204, determining whether the first distance is greater than a predetermined value. If the first distance is greater than the predetermined value, the second vehicle performs S205 to obtain a second sensing result of availability of the channel. As described above, vehicles close in space are likely to be affected by same environmental conditions and suffer from common biases in spectrum sensing. Therefore, there is no need for all the vehicles in the network to sense the channel. The present disclosure chooses appropriate vehicles to sense the channel based on distances between them.

If the first distance is less than the predetermined value, the method S20 goes to S210, stopping collaborative spectrum sensing. Specifically, if the first distance is less than the predetermined value, the second vehicle does not obtain a second sensing result of availability of the channel.

Referring to FIG. 1, vehicles located near to the first vehicle (vehicle 1), such as vehicle 1', have their distances less than the predetermined value and stop collaborative spectrum sensing, which are marked with a cross.

In S205, obtaining a second sensing result of availability of the channel. For example, vehicles which have distances greater than the predetermined value, such as vehicles 2, 2', 3 and 3' as shown in FIG. 1, start to obtain their sensing results of availability of the channel, respectively.

In S206, generating a second sensing message including the second sensing result and the second position information. In some embodiments, the second sensing message may further include predicted precision of the second sensing result, which may also be used subsequently to determine whether the channel is available or not.

In S207, calculating a first count-down time. A count-down time of a vehicle may be used to determine whether to broadcast a sensing message generated in the vehicle. A count-down time of a vehicle is inversely related to a sum of distances between the vehicle and vehicles which already broadcast their position information in the network. That is, the farther the distances between a vehicle and vehicles which already broadcast their position information, the smaller the count-down time of the vehicle is.

In some embodiments, a count-down time of a vehicle may be calculated based on position information of the vehicle and position information received by the vehicle.

In some embodiments, a count-down time T of a vehicle may be calculated according to equation (1) or (2):

$$T = e^{-\eta \Sigma_i^n di} \quad \text{Equation (1)}$$

$$T = \theta / \Sigma_i^n di \quad \text{Equation (2)}$$

where di represents a distance between the vehicle and a vehicle which already broadcast its position information, η and θ are parameters which may be predefined according to specific conditions, and e represents the base number of the Napierian logarithm.

For example, since the vehicle 2 receives position information of vehicle 1, the distance between the vehicles 1 and 2 can be obtained based on the received position information and the position information of vehicle 2. And the first count-down time T1 may be calculated according to equation (3) or (4):

$$T1 = e^{-\eta d1} \quad \text{Equation (3)}$$

$$T1 = \frac{\theta}{d1} \quad \text{Equation (4)}$$

where d1 represents the distance between the vehicles 1 and 2, η and ω are parameters which may be predefined according to specific conditions, and e represents the base number of the Napierian logarithm.

Referring to FIG. 1, because the distance between vehicle 2 and vehicle 1 is greater than that between vehicle 3 and vehicle 1, the count-down time of vehicle 2 is less than that of vehicle 3.

In S208, determining whether a first new sensing message is received before the first count-down time ends. As described above, each vehicle which has its distance greater than the predetermined value may obtain its count-down time which varies depending on the distances.

If no sensing message is received by the second vehicle before the first count-down time ends, the method S20 goes to S209, broadcasting the second sensing message. In some embodiments, after broadcasting the second sensing message, the second vehicle may stop collaborative spectrum sensing.

Figure 2:
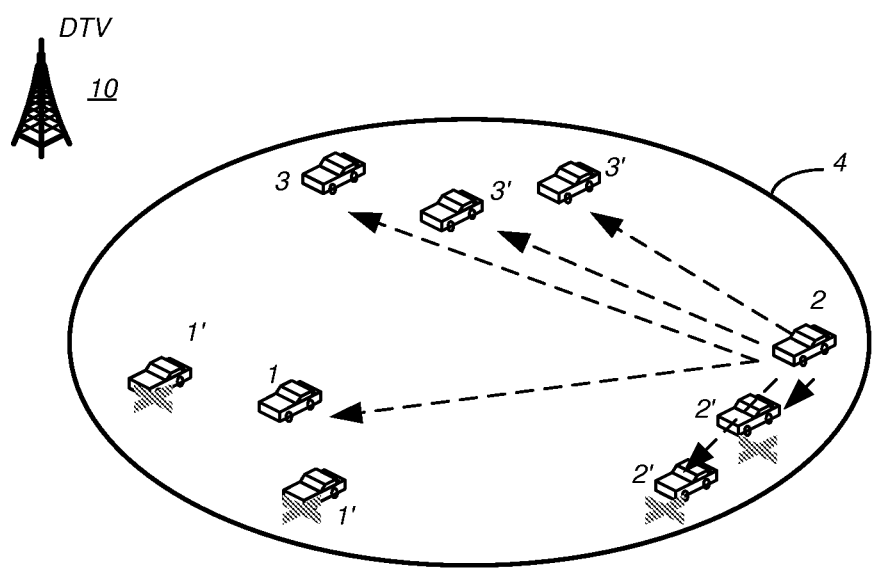

For example, as shown in FIG. 2, vehicle 2 locates farthest from vehicle 1, so vehicle 2 has the shortest count-down time. That is, vehicle 2 may not receive any sensing message in the network before its count-down time ends. Therefore, vehicle 2 may broadcast its sensing message (the second sensing message) in the network when its count-down time ends. While the other vehicles in the network whose count-down times do not end at the moment vehicle 2 broadcasts its sensing message, such as vehicles 2', 3 and 3', may receive the second sensing message before their count-down times end.

Figure 7:
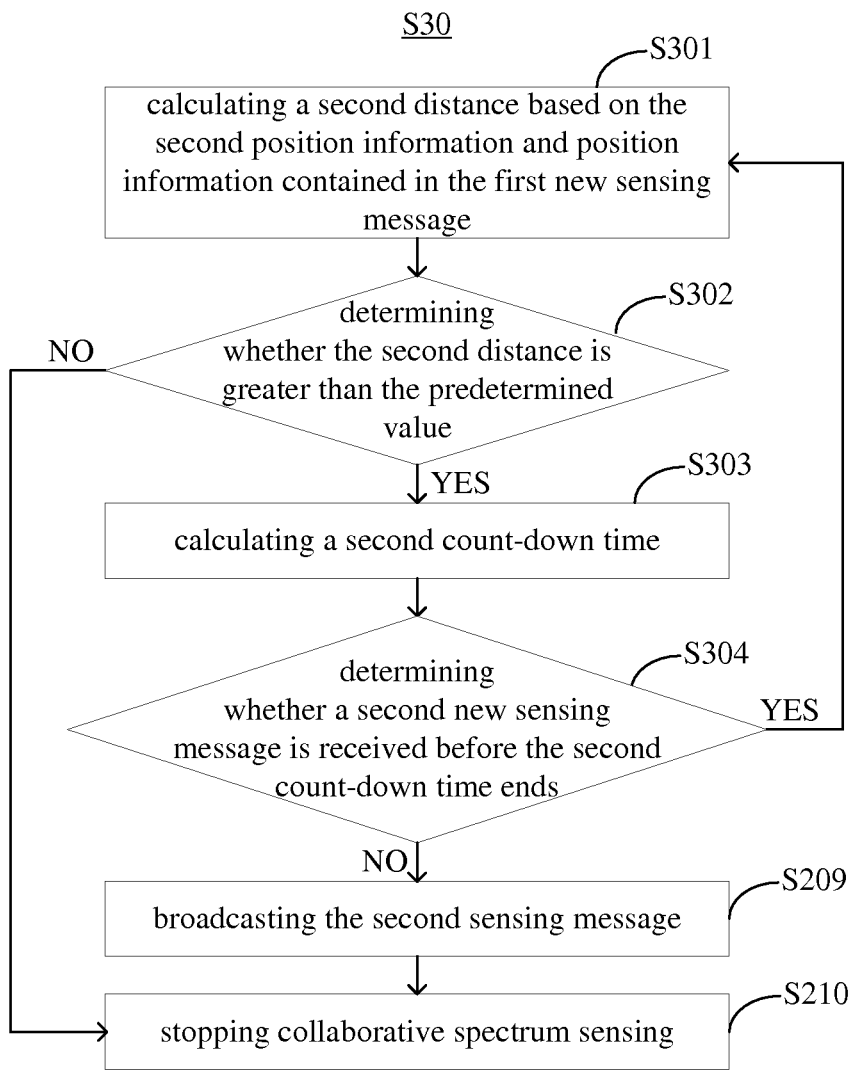
FIG. 7 illustrates a schematic flow chart of a method S30 for collaborative spectrum sensing in a cognitive radio network according to one embodiment of the present disclosure.

If a first new sensing message is received before the first count-down time ends, the method S20 may go to S30. FIG. 7 illustrates a schematic flow chart of a method S30 for collaborative spectrum sensing in a cognitive radio network according to one embodiment of the present disclosure.

In S301, calculating a second distance based on the second position information and position information contained in the first new sensing message. In S302, determining whether the second distance is greater than the predetermined value. S301 and S302 are respectively similar to S203 and S204, and are not described in detail herein.

Referring to FIG. 2, after receiving a request from vehicle 1, vehicle 2 broadcasts its sensing message in response to the request at the earliest. Then each vehicle in the network except vehicles 1 and 1' may calculate its distance between vehicle 2 and itself. For example, vehicles near to vehicle 2, such as vehicle 2', have their distances less than the predetermined value and stop collaborative spectrum sensing, which are marked with a cross.

In S303, calculating a second count-down time. In some embodiments, the second count-down time may be calculated based on the second position information and position information contained in sensing messages received by the second vehicle.

Specifically, a vehicle having its distance greater than the predetermined value may re-calculate its count-down time based on its own position information and position information received by the vehicle.

Figure 3:
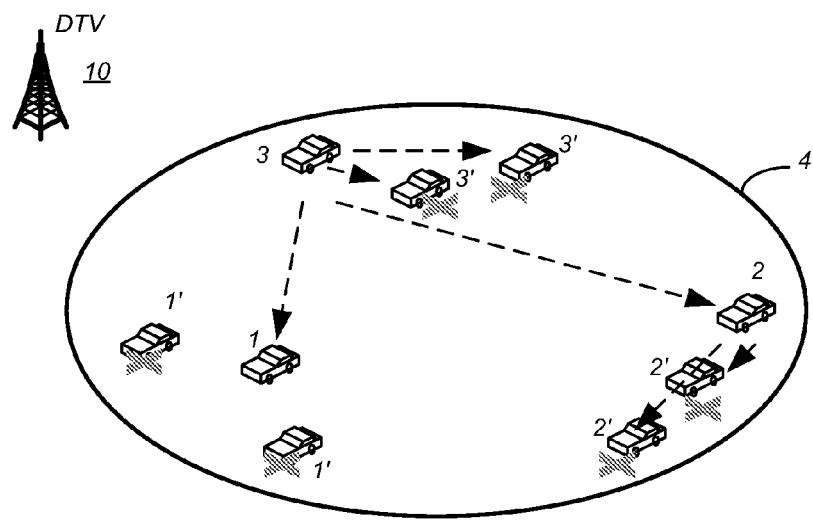
Figure 4:
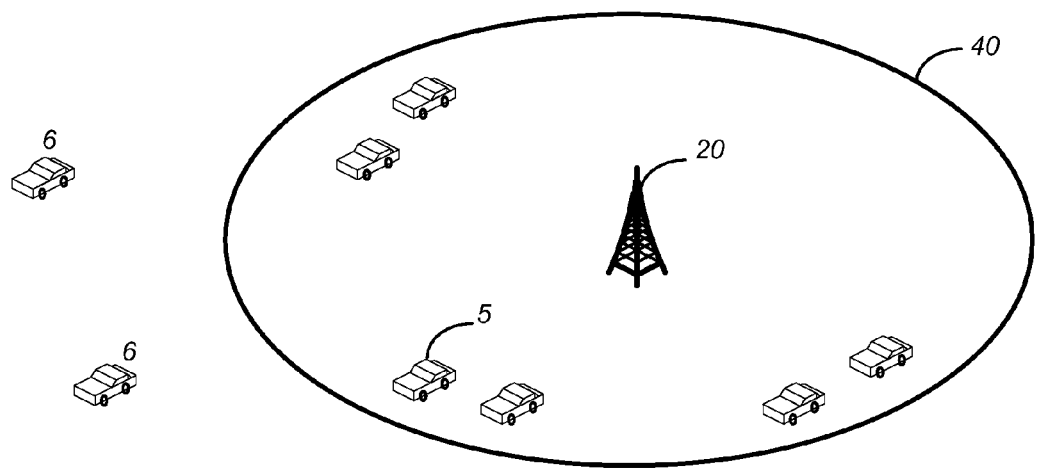

For example, vehicle 3 shown in FIG. 3 receives a sensing message from vehicle 2 before its first count-down time ends, where the first count-down time is inversely related to the distance between vehicle 3 and vehicle 1. After receiving a new sensing message from vehicle 2, vehicle 3 calculates its second count-down time T2, where T2 is inversely related to a sum of a distance between vehicle 3 and vehicle 1, and a distance between vehicle 3 and vehicle 2.

The second count-down time T2 may be calculated according to equation (5) or (6):

$$T2 = e^{-\eta(d2+d3)} \quad \text{Equation (5)}$$

$$T2 = \theta/(d2+d3) \quad \text{Equation (6)}$$

where d2 and d3 respectively represents the distance between the vehicles 3 and 1 and the vehicles 3 and 2, η and θ are parameters which may be predefined according to specific conditions, and e represents the base number of the Napierian logarithm.

In S304, determining whether a second new sensing message is received before the second count-down time ends. The subsequent processes are similar to steps after S208. If a second new sensing message is received before the second count-down time ends, vehicles which do not stop collaborative spectrum sensing may proceed to perform S301 to S303, which are not described in detail hereinafter.

If there is no sensing message received before the second count-down time ends, the method S30 goes to S209, that is, the second vehicle broadcast its sensing message.

For example, vehicle 3 broadcast its sensing message if it doesn't receive a new sensing message before its count-down time ends. Then vehicles having their count-down time not expiring proceed to calculate a third distance based on its own position information and position information of vehicle 3. For example, after receiving a sensing message from vehicle 3, vehicles near to vehicle 3, such as vehicle 3' have distances less than the predetermined value and thereby stop collaborative spectrum sensing, which are marked with a cross as shown in FIG. 3.

In this way, collaborative spectrum sensing is performed by the remaining vehicles in the network successively till an instruction to stop collaborative spectrum sensing is received. All the sensing messages broadcasted within the network are received by the first vehicle which generates the request for assistance on sensing availability of a channel. The first vehicle compares the number of sensing messages received with the predetermined number. If the number of sensing messages received reaches the predetermined number, the first vehicle broadcasts an instruction to stop collaborative spectrum sensing. If not, the first vehicle proceeds to receive a sensing message through the network. After receiving the stop instruction, the remaining vehicles stop performing collaborative spectrum sensing.

By using the methods described above, broadcasting of sensing messages is controlled based on position information of vehicles within the cognitive radio network. That is, a part of vehicles in the network don't have to perform collaborative spectrum sensing, which reduces the overheads inherent to the collaborative spectrum sensing technique and improves performance thereof.

Figure 8:
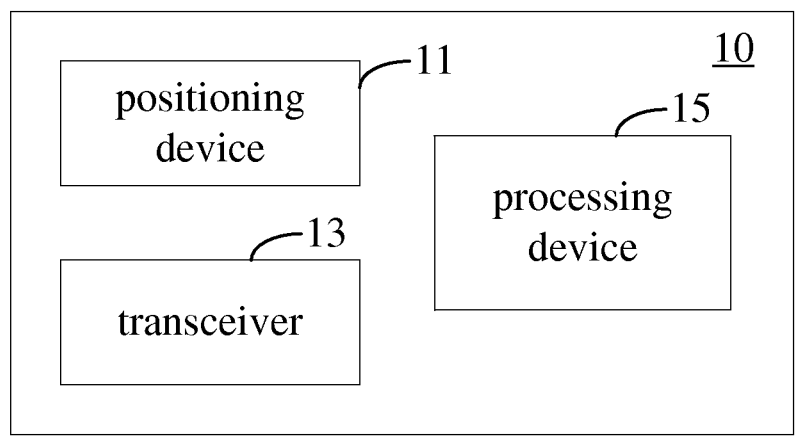
FIG. 8 schematically illustrates a system for collaborative spectrum sensing in a cognitive radio network according to one embodiment of the present disclosure.

According to one embodiment of the present disclosure, a system for collaborative spectrum sensing in a cognitive radio network is provided. The system for collaborative spectrum sensing may be mounted on a vehicle. Referring to FIG. 8, the system 10 may include a positioning device 11, a transceiver 13 and a processing device 15.

The positioning device 11 is adapted for obtaining position information of a vehicle on which the system is mounted. For example, the positioning device may be a GPS device. The transceiver 13 is adapted for broadcasting a request for assistance on sensing availability of a channel or a sensing message. By controlling the positioning device 11 and the transceiver 13, the processing device 15 may be configured to perform S101 to S108 of the method 10, or to perform S201 to S210 of the method 20 and S301 to S304 of the method 30. In some embodiments, the processing device 15 may be a CPU, a GPU, a DSP etc, or any combination thereof.

According to one embodiment of the present disclosure, a computer readable medium, which contains a computer program for collaborative spectrum sensing, is provided. When the computer program is executed by a processor, it will instruct the processor to implementing the methods for collaborative spectrum sensing according to the present disclosure.

By using methods and the system according to embodiments of the disclosure, the efficiency of collaborative spectrum sensing is improved.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for collaborative spectrum sensing in a cognitive radio network, the method comprising:
    a first vehicle generating a request for assistance with respect to sensing the availability of a channel;
    the first vehicle broadcasting in a cognitive radio network the request and position information of the first vehicle;
    the first vehicle receiving a plurality of sensing messages from other vehicles within the cognitive radio network, where the sensing messages are generated in response to the request, where a sensing message comprises a sensing result with respect to the availability of the channel, wherein a particular vehicle receiving the request and the position information of the first vehicle determines whether to broadcast or not broadcast a sensing message based on the position information of the first vehicle and position information of the particular vehicle; and
    determining whether the channel is available based on the plurality of sensing messages.

2. The method according to claim 1, where the position information of the particular vehicle indicates where the particular vehicle is located when the request is received by the particular vehicle.

3. The method according to claim 1, where the position information of the particular vehicle indicates where the particular vehicle is located when a sensing result is generated by the particular vehicle.

4. The method according to claim 1, where the request further comprises information related to a coverage area, a location of a transmitter, and a spectrum of the channel.

5. The method according to claim 1, further comprising the first vehicle generating a first sensing result related to the availability of the channel, where whether the channel is available is determined based on the first sensing result and the plurality of sensing messages.

6. The method according to claim 1, where the position information of the particular vehicle is obtained by a positioning device mounted on the particular vehicle.

7. The method according to claim 1, where, when the number of received sensing results indicating that the channel is available reaches a predetermined number, the first vehicle determines that the channel is available.

8. The method according to claim 1, wherein the particular vehicle receiving the request and the position information of the first vehicle, upon determining that a first distance between the first vehicle and the particular vehicle is greater than a predetermined distance, determines to broadcast the sensing message.

9. The method according to claim 1, wherein the particular vehicle receiving the request and the position information of the first vehicle, upon determining that a first distance between the first vehicle and the particular vehicle is less than a predetermined distance, determines to not broadcast the sensing message.

10. A method for collaborative spectrum sensing in a cognitive radio network, the method comprising:
    receiving through a cognitive radio network a plurality of sensing results related to the availability of a channel, where the plurality of sensing results are generated by a corresponding number of vehicles within the cognitive radio network in response to a request from a first vehicle for sensing the availability of the channel, respectively, wherein a particular vehicle receiving the request determines whether to broadcast or not broadcast a sensing result based on position information of the first vehicle and position information of the particular vehicle; and
    determining whether the channel is available based on the plurality of sensing results.

11. A method for collaborative spectrum sensing in a cognitive radio network, the method comprising:
    a first vehicle receiving through a cognitive radio network a plurality of sensing messages, where a sensing message comprises a sensing result related to the availability of a channel and a piece of position information related to a particular vehicle the generates the sensing result;

when the first vehicle receives a first new sensing message comprising a first piece of position information, calculating a first distance based on first position information related to the first vehicle and the first piece of position information;

if the first distance is greater than a predetermined value, calculating a first count-down time based on the first position information and position information contained in sensing messages received by the first vehicle;

if no new sensing message is received by the first vehicle before the first count-down time ends, the first vehicle broadcasting on the cognitive radio network a new sensing message generated by the first vehicle;

if a second new sensing message comprising a second piece of position information is received by the first vehicle before end of the first count-down time, calculating a second distance based on second position information related to the first vehicle and the second piece of position information; and if the second distance is greater than the predetermined value, calculating a second count-down time based on the second position information and position information contained in sensing messages received by the first vehicle.

12. The method according to claim 11, where a count-down time of a vehicle is calculated based on position information related to the vehicle and position information received by the vehicle.

13. The method according to claim 11, where a new sensing message is generated by the first vehicle upon receiving a request for assistance with respect to sensing the availability of the channel.

14. The method according to claim 13, where the request further comprises information related to a coverage area, a location of a transmitter, and a spectrum of the channel.

15. The method according to claim 14, wherein, when the first vehicle is within the coverage area of the transmitter, the first vehicle calculates the first distance.

16. A system for collaborative spectrum sensing in a cognitive radio network, comprising:
   a positioning device;
   a transceiver; and
   a processing device, the processing device configured to:
      control the positioning device to obtain position information of a first vehicle on which the system is mounted;
      generate a request for assistance with respect to sensing the availability of a channel;
      control the transceiver to broadcast in a cognitive radio network the request and the position information related to the first vehicle;
      control the transceiver to receive a plurality of sensing messages from other vehicles within the cognitive radio network, where the sensing messages are generated in response to the request, where a sensing message comprises a sensing result related to the availability of the channel and a piece of position information related to the vehicle that broadcasts the sensing message, and where broadcasting of the plurality of sensing messages is controlled based on position information of vehicles within the cognitive radio network; and
      determine whether the channel is available based on the plurality of sensing messages.

17. The system according to claim 16, where a piece of position information indicates where a particular vehicle is located when the request is received by the particular vehicle.

18. The system according to claim 16, where a piece of position information indicates where a particular vehicle is located when a sensing result is generated by the particular vehicle.

19. The system according to claim 16, where the request further comprises information related to a coverage area, a location of a transmitter, and a spectrum of the channel.

20. The system according to claim 16, where the processing device is further configured to generate a first sensing result related to the availability of the channel, where whether the channel is available is based on the first sensing result and the plurality of sensing messages.

21. A system for collaborative spectrum sensing in a cognitive radio network, comprising:
   a positioning device;
   a transceiver; and
   a processing device configured to:
      control the transceiver to receive through a cognitive radio network a plurality of sensing messages, where a sensing message comprises a sensing result related to the availability of a channel and a piece of position information related to a particular vehicle the generates the sensing result;
   when the first vehicle receives a first new sensing message comprising a first piece of position information, calculating a first distance based on first position information related to the first vehicle and the first piece of position information;
   if the first distance is greater than a predetermined value, calculating a first count-down time based on the first position information and position information contained in sensing messages received by the first vehicle;
   if no new sensing message is received by the first vehicle before the first count-down time ends, the first vehicle broadcasting on the cognitive radio network a new sensing message generated by the first vehicle;
   if a second new sensing message comprising a second piece of position information is received by the first vehicle before end of the first count-down time, calculating a second distance based on second position information related to the first vehicle and the second piece of position information; and
   if the second distance is greater than the predetermined value, calculating a second count-down time based on the second position information and position information contained in sensing messages received by the first vehicle.

22. The system according to claim 21, where a count-down time of a vehicle is calculated based on position information of the vehicle and position information received by the vehicle.

* * * * *